United States Patent [19]

Brugger et al.

[11] Patent Number: 4,484,280
[45] Date of Patent: Nov. 20, 1984

[54] SYSTEM FOR CONTROLLING THE PROPULSION ON MOTOR VEHICLES

[75] Inventors: Franz Brugger, Winnenden; Manfred Burckhardt, Waiblingen; Horst Grossner, Berglen; Walter Kostelezky, Ostfildern; Siegfried Schlosser, Stuttgart; Richard Zimmer, Fellbach, all of Fed. Rep. of Germany

[73] Assignee: Daimler-Benz Aktiengesellschaft, Fed. Rep. of Germany

[21] Appl. No.: 396,876

[22] Filed: Jul. 9, 1982

[30] Foreign Application Priority Data

Jul. 10, 1981 [DE] Fed. Rep. of Germany ....... 3127302

[51] Int. Cl.³ .............................................. B60T 8/10
[52] U.S. Cl. ..................................... 364/426; 361/238
[58] Field of Search ......................... 364/426; 361/238

[56] References Cited

U.S. PATENT DOCUMENTS

| | | | |
|---|---|---|---|
| 3,260,555 | 7/1966 | Packer | 361/238 X |
| 3,938,612 | 2/1976 | Boudeville et al. | 364/426 X |
| 4,066,300 | 1/1978 | Devlin | 361/238 X |
| 4,374,421 | 2/1983 | Leiber | 364/426 |
| 4,420,191 | 12/1983 | Arikawa et al. | 364/426 X |

Primary Examiner—J. V. Truhe
Assistant Examiner—Bentsu Ro
Attorney, Agent, or Firm—Craig & Burns

[57] ABSTRACT

A system for controlling the propulsion on motor vehicles which not only enables the output torque of the drive unit of the vehicle to be utilized in an optimum manner in critical driving situations, especially under extreme road conditions, but also endows the vehicle with good stability and enhanced driving safety. A comparator is provided, in a propulsion control system which is triggered by at least one presettable or permanently preset threshold value of the speed of the vehicle, and generating an output signal causing the drive torque to be reduced, as soon as this threshold value is exceeded and a signal is present, which indicates that an individual wheel brake is being activated and/or that one of the driven wheels is tending to spin. The threshold value of the speed of the vehicle, which value governs the control process, is preferably regulated in accordance with the transverse acceleration which acts on the vehicle whenever it follows a curved path.

25 Claims, 8 Drawing Figures

SYSTEM FOR CONTROLLING THE PROPULSION ON MOTOR VEHICLES

The invention relates to a system for controlling the propulsion on motor vehicles, in the sense of preventing undesired spinning of the driven vehicle wheels, this system having a first control loop, which reacts to the state of motion of at least the driven vehicle wheels and which, when one of these wheels is tending to spin, activates its wheel brake, and having a second control loop, which causes the output torque of the drive unit to be reduced in the event of a persisting tendency of the driven wheels, on both sides of the vehicle, to spin, as well as having a measuring device, which senses the speed of the vehicle and generates an output signal which is characteristic of this speed.

A system of this type has been disclosed in German Patent Specification No. 1,806,671, in association with a four wheeled vehicle with two driven wheels and two undriven wheels.

Reference is hereby made to companion German Patent application No. P 31 27 301.7-21, and corresponding U.S. application Ser. No. 396,875, filed July 9, 1982 entitled Propulsion Control System for a Vehicle Equipped with An Antiblock System.

In the case of the known system, each wheel is provided with a rotation speed sensor, generating an electrical output signal which is proportional to the rotation speed of the wheel. Two differential amplifiers are provided for processing the wheel rotation speed signals which are output by the rotation speed sensors, each amplifier respectively receiving, as input signals, the wheel speed signals from the driven wheel and the undriven wheel on one side of the vehicle. The output voltage from each differential amplifier is then proportional to the difference between the speeds of the driven and undriven wheels on one side of the vehicle, and is consequently essentially proportional to the slip of the driven wheel which is located on this particular side. The output signals from the differential amplifiers, which signals are proportional to the slip, trigger, in each case, an electronic switch, which becomes conductive when the output signal from the differential amplifier to which it is assigned reaches a defined signal level, as a result of which a brake regulating valve, which can be actuated electromagnetically, is directed into its through flow position, thereby admitting pressure to the wheel brake cylinder of the driven wheel on the vehicle side in question, and thereby braking this wheel. Presetting of a threshold value is achieved by means of suitable resistive circuitry in the differential amplifier, such that the wheel brake in question is not activated until a defined minimum value of the wheel slip is reached or exceeded, this value being a function of the speed. The output signals from the two differential amplifiers are supplied, as input signals, to a dual input AND logic element, the output signal from this element consequently indicating that the slip at the two driven wheels exceeds the preset value, which is regarded as being tolerable. The output signal from the AND logic element activates an actuator which, for as long as this output signal is present, causes the torque of the drive unit to be lowered, for example by switching off the ignition, or by a control action which is applied to the engine fuel supply system, and/or by adjusting the throttle valve, "Economy-Gas".

The known propulsion control system admittedly enables the output torque of the drive unit to be efficiently converted into propulsion torque which accelerates the vehicle, and, to this extent, effects an optimization of the acceleration which can be utilized, for example, when starting the vehicle from rest, or when overtaking. The type of propulsion control achieved with the known system, which employs a first—rapidly-responding—control loop, which activates the wheel brake of a drive wheel, on either side of the vehicle, which exceeds a preset slip value, and which employs a second control loop, which exercises control over the drive unit and which does not react until the above-mentioned limiting slip value is reached or exceeded on both sides of the vehicle and which is consequently, as a general rule, considerably slower to react than the first control loop, possesses the disadvantage, however, that the vehicle can become involved in a dangerous driving situation precisely as a result of the action of the known control system. In the case of a vehicle with rear wheel drive a dangerous situation of this type occurs, for example, when, on a rain wet road, the adhesion between the driven wheels and the roadway is small, and the driven wheels are already experiencing a comparatively high amount of slip, which is still, however, below the reaction threshold of the propulsion control system. If, from travelling in a straight line, the vehicle now starts to follow a curved path, the drive wheel on the inside of the curve becomes more liable to spin, on account of the load reduction which this wheel experiences while the vehicle follows the curved path. If the control loop which acts on the wheel brake of this rear wheel now reacts, this wheel will admittedly be braked, and its slip will thereby be reduced, but, at the same time, the differential effect will increase the effective torque at the rear wheel on the outside of the curve, and this will inevitably lead to the result that the slip at the drive wheel on the outside of the curve will now increase, this wheel being the one which is more important for the lateral guidance during cornering, this increased slip causing a deterioration in its lateral guidance characteristics, with the result that the vehicle breaks away, although the limiting slip value governing the triggering of the propulsion control system has not yet been reached at the rear wheel on the outside of the curve.

Similar dangerous situations can also be precipitated during a cornering maneuver which has already been initiated, when the condition of the roadway results in marked fluctuations in the coefficients describing the adhesion which can be utilized at the drive wheels.

The object of the invention is accordingly to provide a system, of the type initially mentioned, for controlling the propulsion on motor vehicles, which endows the vehicle with good stability and, consequently, enhanced driving safety, especially under extreme road conditions.

This object is achieved, according to the invention, by means of a system for controlling the propulsion on motor vehicles, in the sense of preventing undesired spinning of the driven vehicle wheels, the system having a first control loop, which reacts to the state of motion of at least the driven vehicle wheels and which, when one of these wheels is tending to spin, activates its wheel brake, and having a second control loop, which causes the output torque of the drive unit to be reduced in the event of a persisting tendency of the driven wheels, on both sides of the vehicle, to spin, and having a measuring device, which senses the speed of the vehicle and generates an output signal which is characteristic of this speed, and a comparator is provided, which is triggered by at least one presettable or permanently preset threshold value of the speed of the vehicle, the comparator generating an output signal which effects the reduction of the drive torque as soon as this threshold value is exceeded and a signal is present, which indicates that an individual wheel brake is being activated and/or that one of the driven wheels is tending to spin.

The control behavior of this system corresponds, below a threshold speed value, to that of the known propulsion control system, but is characterized, above this threshold speed value, by the fact that a control action is applied to the drive unit as soon as only one of these driven wheels exhibits a tendency to spin, this control action causing the propulsion torque to be reduced.

In, for example German Auslegeschrift No. 2,131,536, in association with a propulsion control system which applies a torque reducing control action to the drive unit of a motor vehicle, it is proposed to inhibit the slip control system below a threshold vehicle speed, of 3.2 km/h. In this proposed construction, the speed threshold is provided in the sense of a switching on threshold, which is merely intended to prevent the engine from being stalled in a situation involving starting from rest, or if it is necessary to shunt the vehicle slowly backwards and forwards, in order, for example, to overcome a snowdrift.

In contrast to this, and presupposing a conventional gearbox design, the speed threshold $v_{s1}$, which is provided in accordance with an object of the invention, and which corresponds approximately to the maximum speed which can be attained in the first gear, represents a switch over threshold at which the propulsion control system according to the invention changes its control behavior, irrespective of the direction in which this threshold is crossed, this control system functioning, below this switch over threshold, in the sense of optimizing the propulsion induced acceleration, and functioning, above this switch over threshold, in the sense of optimizing the stability of the vehicle while it is being driven.

Presupposing the presetting of a suitable value for the speed threshold $v_{s1}$, the essential advantage of the propulsion control system according to the invention resides in the fact that, in the range corresponding to relatively high driving speeds, over which $v > v_{s1}$, that is to say, in that speed range over which any instability in the driving behavior could have dangerous consequences, a marked improvement in the stability of the vehicle is guaranteed. This improvement applies, in particular, when the vehicle is cornering, or when, after travelling in a straight line, it starts to follow a curved path, that is to say, when significant transverse accelerations act on the vehicle, and a reduction in its cornering capability cannot consequently be tolerated.

Starting from the fact that it is desirable, per se, to be able to utilize the output torque of the drive unit to the greatest possible extent, the propulsion control system, according to the invention, ceases to function in an optimum manner, above the threshold value $v_{s1}$, as soon as the drive wheel which has the poorest adhesion with the roadway begins to spin and the reduction in the engine output torque is immediately initiated. As already mentioned above, this "Select-Low" type of control nevertheless has the major advantage that the stability of the vehicle is preserved even in critical driving situations.

The threshold value $v_{s1}$ should accordingly be adjusted in the manner of a best possible compromise between optimum propulsion induced acceleration and driving safety, in such a way that, depending on the requirement, an adequately wide low speed range is available, in which optimum vehicle acceleration and/or propulsive force can be utilized, while the lower limiting speed $v_{s1}$ for "Select-Low" operation is nevertheless still sufficiently low to avoid dangerous driving situations in a reliable manner.

According to a further object of the invention, in the sense of the best possible compromise, as explained above, the value of approximately 40 km/h as the speed threshold $v_{s1}$, represents an advantageous design of a propulsion control system. Presetting the $v_{s1}$ threshold value to such a value ensures that the control system functions in the sense of optimizing the propulsion induced acceleration in those driving situations in which the full output torque of the drive unit should be available, such as when starting from rest, or when driving uphill, situations in which any breaking away of the vehicle is, in any case, non-critical and easily controllable, while, on the other hand, in driving situations in which the safety aspect becomes dominant, that is to say, in the range of comparatively high driving speeds, the propulsion control system functions in the sense of optimizing the stability of the vehicle.

While, during cornering, considerable transverse accelerations already occur at comparatively low vehicle speeds and in the case of comparatively large curve radii, and correspondingly high lateral guidance forces are required in order to ensure the directional stability and driving stability of a vehicle, very much lower lateral guidance forces suffice for this purpose when the vehicle is travelling in a straight line, during which the vehicle is not subjected to transverse accelerations of any kind. When travelling in a straight line, the need for a torque reducing control action, applied to the drive unit, to maintain the driving stability, does not occur until the vehicle speed reaches very much higher values than in the case where the vehicle is following a curved path.

According to another object of the invention, in a preferred further development of the propulsion control system, as set forth above, a second, higher speed threshold value $v_{s2}$ of, for example, 100 km/h can be preset or is preset. The system has a comparator generating an output signal when this threshold value is being exceeded, as soon as only a single brake control signal is present, indicating that one of the driven wheels is tending to spin, the comparator output signal causing the drive torque to be reduced. The comparator which is triggered by the first threshold value $v_{s1}$ can be activated by the output signal from a device for recognizing that the vehicle is following a curved path. When the vehicle is travelling in a straight line, the "Select-Low" operation of the propulsion control system does not become effective until a further speed-threshold value $v_{s2}$ is exceeded, this value being higher than the first threshold value $v_{s1}$, and a device for recognizing that the vehicle is following a curved path is provided, this device emitting an output signal for as long as the vehicle continues to follow a curved path, this signal holding the propulsion control system in that operating condition in which the lower speed threshold value $v_{s1}$ is the active threshold value for the "Select-Low" operation.

In accordance with another object of the invention, as described above, for a four wheeled vehicle with one driven wheel and one undriven wheel on each of its sides, the wheels are provided with rotation speed sensors generating output signals which are correlated with the respective wheel speeds, for example pulse signals at a frequency which is proportional to the rotation speed, a first slip signal being generated, from the processing of these signals, by a signal processing circuit. This first slip signal is proportional to the difference between the speeds of the wheels on one side of the vehicle. A second slip signal is generated, which is proportional to the difference between the speeds of the wheels on its other side, the two slip signals being supplied as input signals, to one comparator in each case, this comparator generating a control signal in the event of a threshold value $\lambda_M$, which is considered as permissible, being exceeded, this signal being for a brake pressure regulating valve assigned thereto, and causing the brake of the driven wheel, on the vehicle side in question, to be activated. An AND operation circuit is provided, which receives the slip signals, as input signals, the output signal from this circuit initiating a control action which is applied to the drive unit in the sense of reducing the drive torque, characterized in that a switching unit is provided, which processes the wheel speed signals from the undriven wheels, for example by summation or averaging, within a predetermined cycle time interval $\Delta t_i$, to generate a v-signal which is proportional to the speed of the vehicle, this v output signal being supplied to a comparator which when the v-signal exceeds a preset reference threshold value $v_{s1}$, generates an output signal which is supplied to one input terminal of each of two dual input AND elements, the output signals from the slip signal comparators, one of which is assigned to each side of the vehicle, being supplied to the other input terminals of these AND elements, and in that an actuator for reducing the drive torque is provided, which element is capable of being activated by the output signal from the two AND elements.

In accordance with yet another object of the invention, two logic elements are provided, within the scope of the evaluation circuit of the control system, these logic elements generating a control signal, which triggers the activation of the wheel brake of the wheel which is tending to spin, from the AND combination of the output signal from, in each case, one of the two $\lambda_M$-comparators with the inverted output signal from, in each case, the other of these comparators.

In accordance with another object of the invention, a second comparator is provided, which generates an output signal as soon as the speed, v, of the vehicle exceeds a second threshold value $v_{s2}$, which is greater than the first threshold value $v_{s1}$, in that the output terminal of this additional comparator is connected to one input terminal, in each case, of two dual input AND elements, the other input terminals of these elements being connected, in each case, to the output terminal of one of the two slip value comparators, the high level output signals from the two AND elements triggering the torque reducing control action which is applied to the drive unit, and in that an electronic switching element can be triggered by the output signal from the device for recognizing that the vehicle is following a curved path, this element switching the signal flow from the $v_{s2}$-comparator to the AND elements which are series connected with this coparator, as long as the output signal from the device for recognizing that the vehicle is following a curved path is present, and blocking this signal flow if this latter output signal is absent.

It is another object of the invention to provide design configurations of the electronic signal processing and signal logic sections of the propulsion control system, which can be implemented by conventional means within the capability of analog and/or digital electronic circuit technology. The advantage of this circuit construction resides in the fact that a signal processing circuit which is provided, for example, within the scope of an antiblock system which is already present on the vehicle, this circuit processing the sensor output signals, which are proportional to the wheel speeds, to produce output signals which are proportional to the wheel speeds and wheel accelerations, are suitable for further processing, and characterize the slip of the driven vehicle wheels, can also be employed, for analogous purposes, within the scope of the propulsion control system according to the invention. If an antiblock system is present on the vehicle, this propulsion control system can accordingly be designed, with regard to its electronic circuitry, as a comparatively simple accessory system, which can be produced comparatively inexpensively, so that the additional expenditure which has to be devoted to the propulsion control system amounts to only approximately 10–20% of the price of an antiblock system.

Within the scope of the propulsion control system, alternative design configurations are provided of devices for recognizing that the vehicle is following a curved path, these configurations being also capable, under some circumstances, of being employed in combination, these devices generating a signal which indicates that the vehicle is following a curved path by monitoring the position of a component of the steering mechanism, this position being characteristic of cornering or generating this signal from the difference between the wheel rotation speeds of the undriven vehicle wheels and/or by detecting the transverse acceleration acting on the vehicle.

It is another object of the invention to provide a system wherein a device for recognizing that the vehicle is following a curved path comprises in each case, rotation speed sensors which respectively sense the wheel rotation speed of the undriven wheels, as well as a comparator, which generates a signal indicating that the vehicle is following a curved path, from the difference between the wheel speed signals output by the rotation speed sensors and the device for recognizing that the vehicle is following a curved path is configured as a device for measuring centrifugal force or transverse acceleration, and wherein an electrical switch contact device is provided as the device for recognizing that the vehicle is following a curved path, this switch contact device reacting when the steering mechanism is operated.

Insofar as devices of this type, for recognizing that the vehicle is following a curved path, generate an output signal which is proportional to the transverse acceleration, it is possible to utilize this signal to effect a change in the value of the speed threshold appropriate to the requirements, above which value the "Select Low" operating mode of the propulsion control system is effective.

It is a further object of the invention to provide a system wherein a device for recognizing that the vehicle is following a curved path generates an output signal which is proportional to the expression $f_{RF}^2 - f_{LF}^2$, in which $f_{RF}$ and $f_{LF}$ denote the frequencies of the output signals from the rotation speed sensors assigned to the undriven wheels and wherein a threshold value transmitter can be triggered by the output signal from the device for recognizing that the vehicle is following a curved path, this signal being proportional to the transverse acceleration, the output signal from the threshold value transmitter being the reference signal for a speed comparator, the output signal from which causes the triggering of the torque reducing control signal if an output signal from one of the slip value comparators is present at the same time, and in that the output signal level of the threshold value transmitter varies in the opposite sense to the output signal level of the device for recognizing that the vehicle is following a curved path and corresponds to a high threshold value $v_{s2}$ when the vehicle is travelling in a straight line (low transverse acceleration), and to a low threshold value $v_{s1}$ when the transverse acceleration is high (following a curved path at high speed, and/or following a small radius curve).

It is also possible to achieve additional safety, in the sense of maintaining the stability of the vehicle, by means of a circuit device, which triggers the application of a torque reducing control action to the drive unit of the vehicle, when the values representing the acceleration of the vehicle exceed a critical threshold value, these values preferably being determined from the wheel rotation speeds of the undriven vehicle wheels. This precaution effectively guards against a dangerous situation which can occur, for example, when the vehicle is in a driving situation in which the propulsion induced acceleration is high, and in which there is consequently also a comparatively large amount of slip at the driven wheels, and in which road conditions are present which are associated with considerable fluctuations in the values of the adhesion coefficient. Under such conditions, it is advantageous if the device is designed in a manner such that this acceleration dependent control of the engine torque does not become effective until above a preset vehicle speed threshold, of, for example 20 to 30 km/h, so that the maximum possible propulsion induced acceleration remains available for use when starting the vehicle from rest.

It is yet another object of the invention to provide a circuit component e.g. an acceleration comparator which is triggered by a threshold value of the vehicle acceleration and, in the event of this acceleration threshold value being exceeded, generates an output signal causing the drive torque to be reduced and wherein an output signal causing the drive torque to be reduced can be extracted from an AND combination of the output signal from the acceleration comparator, with the output signal from a further speed comparator, the latter employing a reference threshold value $v_a$ of approximately 20 km/h.

It is another object of the invention to provide a system wherein the acceleration of the driven vehicle wheels is utilized as the command variable. Even if a control device of this type, regarded on its own, does not already meet the essential requirements of an effective propulsion control system, it provides additional safety and driving stability, at least when combined with the embodiments explained earlier in this text.

In such a system, a comparator is provided which reacts to the propulsion induced acceleration of the driven wheels, and which, when a presettable or preset threshold value of the peripheral acceleration at one or both of the driven wheels is exceeded, generates an output signal causing the reduction of the output torque of the drive unit, and which, if the magnitudes of the wheel accelerations are unequal, generates an output signal causing a compensatory activation of the wheel brake of the drive wheel which is being more powerfully accelerated.

It is an object of the invention that the dimensioning of the supply pressure source for the propulsion control system guarantees that the propulsion control system functions reliably even when widely different adhesion coefficients are effective at the driven wheels. According to this feature of the invention, the system is characterized in that the output pressure level p of the pressure source of the propulsion control system is selected in accordance with the relationship $$p = \frac{r}{r_m} \times \frac{(I_2 - I_1)}{2\mu_B \times F_k} \times mg.$$

in which $I_1$ and $I_2$ denote, respectively the maximum possible vehicle acceleration under the lowest and the highest possible values of the roadway/wheel adhesion coefficient, r denotes the effective rolling radius of the driven wheels, $r_m$ denotes the mean frictional radius of the brake disc, $\mu_B$ denotes the coefficient of friction of the brake pads, and $F_k$ denotes the cross-section of the brake-caliper piston of the wheel brakes.

It is another object of the invention that the switching off facility, enables the driver to render the propulsion control inoperative for a defined time interval, if, for example, he wishes to drift through a corner in a "power-slide". According to this feature of the invention, the propulsion control system can be switched off for a time interval which is preset by means of a timing element, and, after this interval, reverts to the read-to-control state.

It is yet another object of the invention that a protection device which automatically switches off that functional section of the propulsion control system which acts on the braking system, prevents the rear wheel brakes from overheating when the propulsion control is being triggered frequently. A protection device of this type is of major importance with regard to the operational reliability of the braking system.

According to this feature of the invention, a protection device is provided, which switches on an alarm indicator in the event of pronounced heating of the brakes of the driven vehicle wheels, and which, if the overheating of the brakes persists, switches off that section of the propulsion control system which activates these brakes, or at least lowers the threshold for the control action which is applied to the drive unit in order to reduce the propulsion torque.

It is another object of the invention that the design arrangement of temperature sensors has the advantage that the temperature of the brake discs can be very accurately measured, and in that their heating dissipation capability can be utilized to the greatest possible extent. This feature of the invention is characterized in that the brake discs of the driven wheels are provided with thermoelectric temperature sensors, thermocouples, the output signals from these sensors, which signals are proportional to the temperature, being led to the processing unit of the protection device via contacts of the slip ring type.

It is a further object of the invention to provide alternative arrangements of temperature sensors. According to the invention, these features are capable of implementation particularly simply, in terms of design, and also being capable in some circumstances, of being utilized in combination.

Thus, brake pads of the wheel brakes are provided with temperature sensors, the electrical output signals from these sensors being a measure of the temperature of the brake discs.

The temperature sensors are fitted in holes which are provided, in the brake pads, for receiving wear-sensors, or are attached to wear-sensors themselves.

Wear-sensors may be provided which are designed as a thermocouple, the wear indication signal being triggered by the electrical interruption of this thermocouple, or by its grounding to the vehicle structure, effected via the brake disc.

It is another object of the invention that the information relating to the quantity of heat which is being generated and/or stored in a particular wheel brake, this information being required for the protective switching off of the propulsion control system, also be obtained by means of a circuit arrangement provided according to the invention which generates a signal, from an evaluation of the pressure of the brake medium in the wheel brake cylinders and from the wheel rotation speeds of the braked wheels, this signal corresponding to the work which is converted into heat in the course of one braking operation.

Thus, according to the invention, within the scope of a protection device, at least one multiplication stage is provided, which generates an output signal proportional to the expression $p_i N_i$, in which $p_i$ is the measured value of the brake fluid pressure for successive cycle-time intervals $\Delta t_i$, the total duration of these intervals corresponding to the activation time of the wheel brake in question, and $N_i$ is the number of wheel revolutions measured for the individual cycle time intervals, and in that a comparator stage is provided, which generates an alarm indication signal as soon as this output signal exceeds a preset threshold value, which is a measure of a limiting temperature to which the wheel brake may be heated.

It is another object of the invention that electrical signal which are proportional to the pressure of the brake medium, and which are suitable for evaluation, be obtained by means of suitable sensors or by electronic evaluation of the vehicle acceleration, or of the acceleration of the driven wheels, and thus, in the end, by evaluating the output signals from the rotation speed sensors, which are proportional to the wheel rotation speeds, with the particular advantage that the mechanical engineering effort associated with the pressure sensors is then dispensed with.

According to these alternatives of the invention, the wheel brake cylinders of the driven vehicle wheels are each provided with a pressure sensor, the electrical pressure signals output by these sensors being led, as input signals, to the multiplication stage or alternatively a computer stage is provided, which receives, as input signals, output signals characterizing the vehicle acceleration, and which generates, from the signals by electronic evaluation of the relationship $$p = \frac{r}{r_m} \times \frac{(I_2 - I_1)}{2\mu_B F_k} \times mg$$

the output pressure signals $p_i$ which are required for evaluating the relationship $$E = K \sum_{1} p_i N_i$$

These and other objects, features and advantages of the present invention will become more apparent from the following description when taken in connection with the accompanying drawings which show, for the purposes of illustration only, various embodiments in accordance with the present invention, and wherein.

Figure 1:
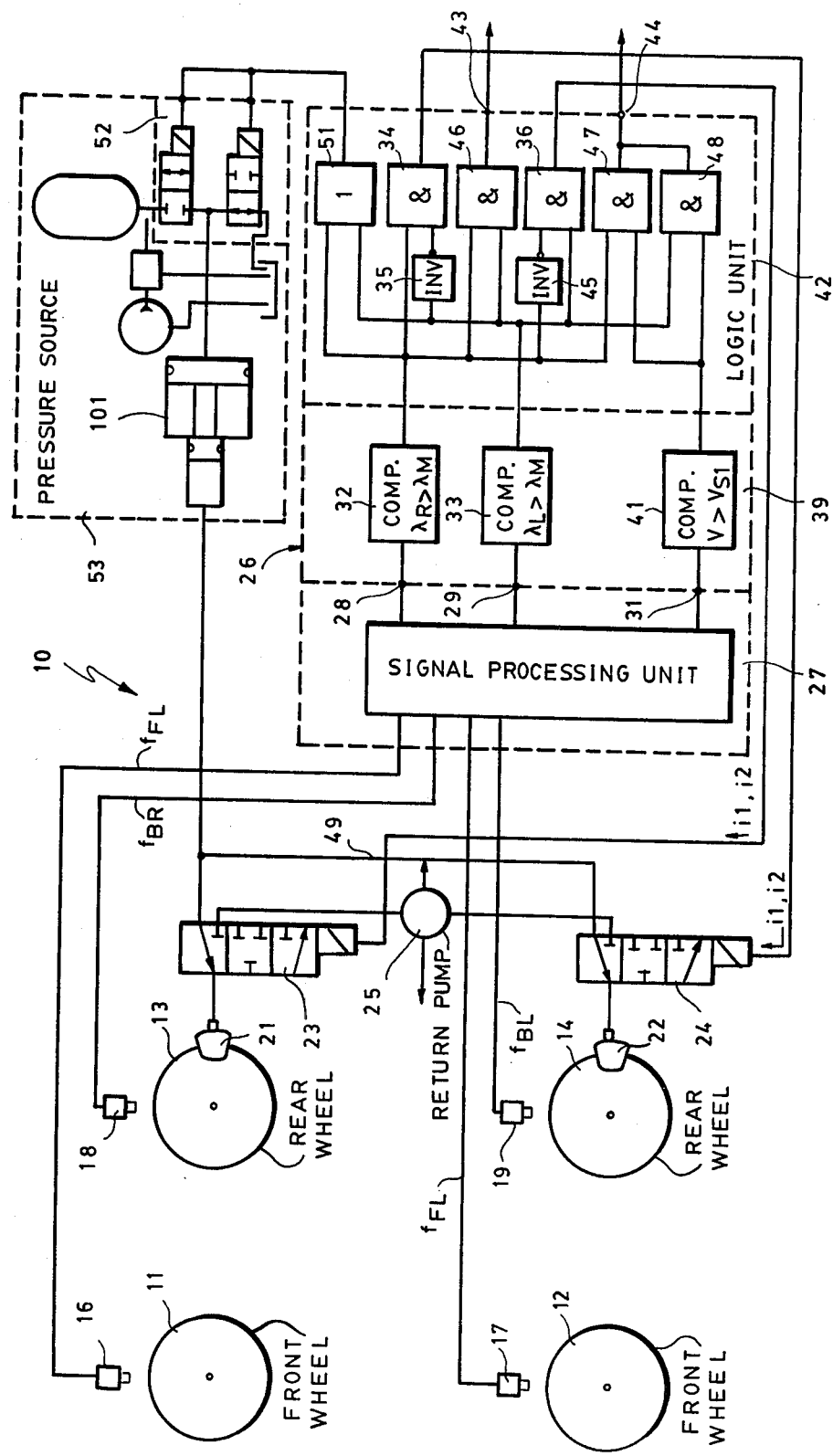
FIG. 1 shows a heavily simplified block circuit diagram of a first, simple embodiment of a propulsion control system according to the invention.

Referring now to the drawings, wherein like reference numerals are used to designate like parts and, more particularly, to FIG. 1, according to the figure, a construction of a vehicle with rear wheel drive is assumed, without any limitation of its general applicability, for the propulsion control system 10, according to the invention, the vehicle in question being provided, moreover, with a 4 channel antiblock system ("ABS system"), of which the wheel rotation speed sensors 16 and 17, and 18 and 19, respectively allocated to the front wheels 11 and 12, and to the driven rear wheels 13 and 14, and the brake pressure regulating valves, 23 and 24, provided for the rear wheel brakes 21 and 22, are simultaneously utilized for the propulsion control system 10.

These regulating valves 23 and 24 are designed, in accordance with their function within the scope of the ABS system, as magnetically controlled 3/3-way valves which, in their normal position, connect the wheel brake cylinders of the wheel brakes 21 and 22 to the brake line 49, via which the build up of brake pressure is effected. By applying a control current signal i1, of, for example, 2A, the brake pressure regulating valves 23 and 24 can be directed to take up their shut off position, which corresponds to the pressure holding phase, and by applying a control current signal i2, of, for example, 4A, they can be directed to take up their return flow position, which corresponds to a brake pressure release phase, in which, as indicated diagrammatically, brake fluid is conveyed back, from the wheel brake cylinders, into the brake line 49 and into the brake master cylinder—not shown—by means of the return pump 25, which is provided within the scope of the ABS system.

The electronic evaluation circuit, which is marked in its entirety as 26, is both a central component of the propulsion control system 10, and a component which is essential of the invention, this evaluation circuit generating signals for triggering the actuators and switching elements provided for initiating the braking, appropriate to the driving situation, of the particular driven rear wheel 13 or 14, which is tending to spin, or for initiating a reduction of the output torque of the drive unit, which is not shown, these signals being produced from a processing, which is to be explained in more detail in the text which follows, of the output signals from the rotation speed sensors 16 to 19, which are proportional to the wheel rotation speeds.

As an input stage, the evaluation circuit 26 possesses a signal processing stage 27 with four inputs, at which, in each case, one of the output signals $f_{FR}$, $f_{BR}$, $f_{FL}$ and $f_{BL}$ is received from the rotation speed sensors, it being assumed, again without limiting the general applicability, that these signals are electrical pulse sequences of pulse repetition frequency f which is proportional to the wheel rotation speed. The signal processing stage 27 processes these input signals to produce a first output signal which is characteristic of the magnitude of the slip $\lambda_R$ of the righthand driven rear wheel 13, and to produce a second output signal which is characteristic of the slip $\lambda_L$ of the lefthand driven rear wheel, these signals being output from the two output terminals 28 and 29 of the processing stage respectively. The $\lambda_R$ signals and $\lambda_L$ signals are calculated, respectively, from the difference between the speeds of the wheels on the righthand and lefthand sides of the vehicle. In addition, the processing stage 27 generates, at its third output terminal 31, a v-output signal, which is proportional to the speed v of the vehicle by, for example, averaging or summation of the wheel rotation speeds of the undriven front wheels 11 and 12. The two $\lambda_R$ and $\lambda_L$ output signals from the processing stage 27 are, in each case, led, as input signals, to a comparator 32 or 33, these comparators comparing these signals with a preset threshold value $\lambda_M$, which represents a value of the slip at the driven wheels 13 and 14, which is regarded as a permissible maximum value. As soon as the slip $\lambda_R$ or $\lambda_L$ of either of the driven wheels 13 and 14 reaches or exceeds this threshold value $\lambda_M$, the comparator 32, and/or the comparator 33, emits a high level output signal. In addition, a third comparator 41 is provided, within the scope of the comparator unit, which includes the two slip value comparators 32 and 33 and is marked, in its entirety, as 39, this third comparator 41 emitting a high level output signal as soon as the speed v of the vehicle reaches or exceeds a preset or suitably presettable threshold value $v_{s1}$.

The output signals from the comparators 32, 33 and 41 of the comparator unit 39 are led as input signals to a logic circuit, which is provided within the scope of the evaluation circuit 26 and is marked in its entirety as 42, this logic circuit emitting, at its output terminals 37 and 38, the control signals for the brake pressure regulating valves 24 and 23, these signals being required for the functionally correct triggering of the wheel brakes 22 and 21, and emitting at the output terminals 43 and 44, or also, if appropriate, only at one common output terminal, the control signals by means of which the reduction of the output torque of the drive unit can be initiated, all these signals being produced by logic operations, which are to be explained in more detail in the text which follows, on various combinations of the output signals from the comparators.

The logic unit 42 comprises a total of five dual input AND elements 46, 47 and 48, and 34 and 36, the output terminals of the two $\lambda_M$ comparators, 32 and 33, being connected to the two input terminals of the first AND element 46. The output terminal of the first $\lambda_M$ comparator 32 and the output terminal of the $v_{s1}$ comparator 41 are respectively connected to the input terminals of the second AND element 47, and the output terminal of the second $\lambda_M$ comparator 33 and, likewise, the output terminal of the $v_{s1}$ comparator 41 are respectively connected to the input terminals of the third AND element 48.

The output signals from these AND elements 46, 47 and 48, which are present at the output terminals 43 and 44 of the logic unit 42, are employed to control the torque reducing control action which is applied to the drive unit of the vehicle.

The two further dual input AND elements 34 and 36 each receive, at one of their input terminals, the output signal from, in each case, one at the two $\lambda_M$ comparators 32 and 33 and receive, at their other input terminal, the inverted output signal, arriving via an inverter 35 or 45, from, in each case, the other of the two $\lambda_M$ comparators 33 or 32. The output signals from the two additional AND elements 34 and 36, present at the output terminals 37 and 38 of the logic circuit 42, enable the brake pressure regulating valves 24 and 23 to be directed into their shut off position. The driver stages which, under some circumstances, are necessary for this purpose are not represented, for the sake of simplicity.

In addition, a dual input OR element 51 is provided, to which the output signals from the $\lambda_M$ comparators 32 and 33 are led directly, as input signals.

The propulsion control system, which has been explained up to this point, operates in the following manner.

If one of the driven rear wheels 13 or 14 begins to spin, the output signal from the first or second $\lambda_M$ comparator, 32 or 33, which is triggered by the spinning wheel, and the output signal from the directly series connected AND element 34 or 36, thus causes the brake pressure regulating valve 24 or 23 of the other rear wheel, 14 or 13, which is not spinning, to be directed out of its normal position, in which the wheel brake cylinder in question communicates with the brake line 49 of the rear axle brake circuit, into its shut off position, while the brake pressure regulating valve of the spinning wheel remains in its normal position. At the same time, the output signal from the OR element 51 causes a relay valve arrangement 52 to switch into its through flow direction, in which a pressure source, marked generally designated by reference number 53, is connected to the brake line 49 the pressure level of this pressure source being sufficiently high to activate the wheel brake of the wheel which is spinning. If both the $\lambda_M$ comparators, 32 and 33, emit a high level output signal, that is to say, if both the driven wheels, 13 and 14, are tending to spin, the output signal from the first AND element 46 is thus also a high level signal, by means of which an actuator is now triggered, which, at 44, effects the above-mentioned reduction of the output torque of the drive unit. Due to the negation, effected by the inverters 35 and 45, of, in each case, one input signal to the AND elements 34 and 36, their output signals continue to be low level output signals for as long as both the $\lambda_M$ comparators, 32 and 33, are generating their high level output signals, that is to say, the brake pressure regulating valves 23 and 24 are in their normal position, in which both the wheel brakes, 21 and 22, are activated.

This type of propulsion control is effective, as long as the speed v of the vehicle is less than the reference threshold value $v_{s1}$ of the third comparator 41.

If this threshold value is reached, or exceeded, an output signal causing the reduction of the output torque of the drive unit is emitted, at the common output terminal 44 of the two AND elements 47 and 48, as soon as only one of the two driven wheels, 13 or 14, begins to spin. Below the threshold value $v_s$, the propulsion control system 10 functions in the sense of optimizing the acceleration of the vehicle, while above this threshold value it functions in the sense of optimizing the driving stability.

Figure 2:
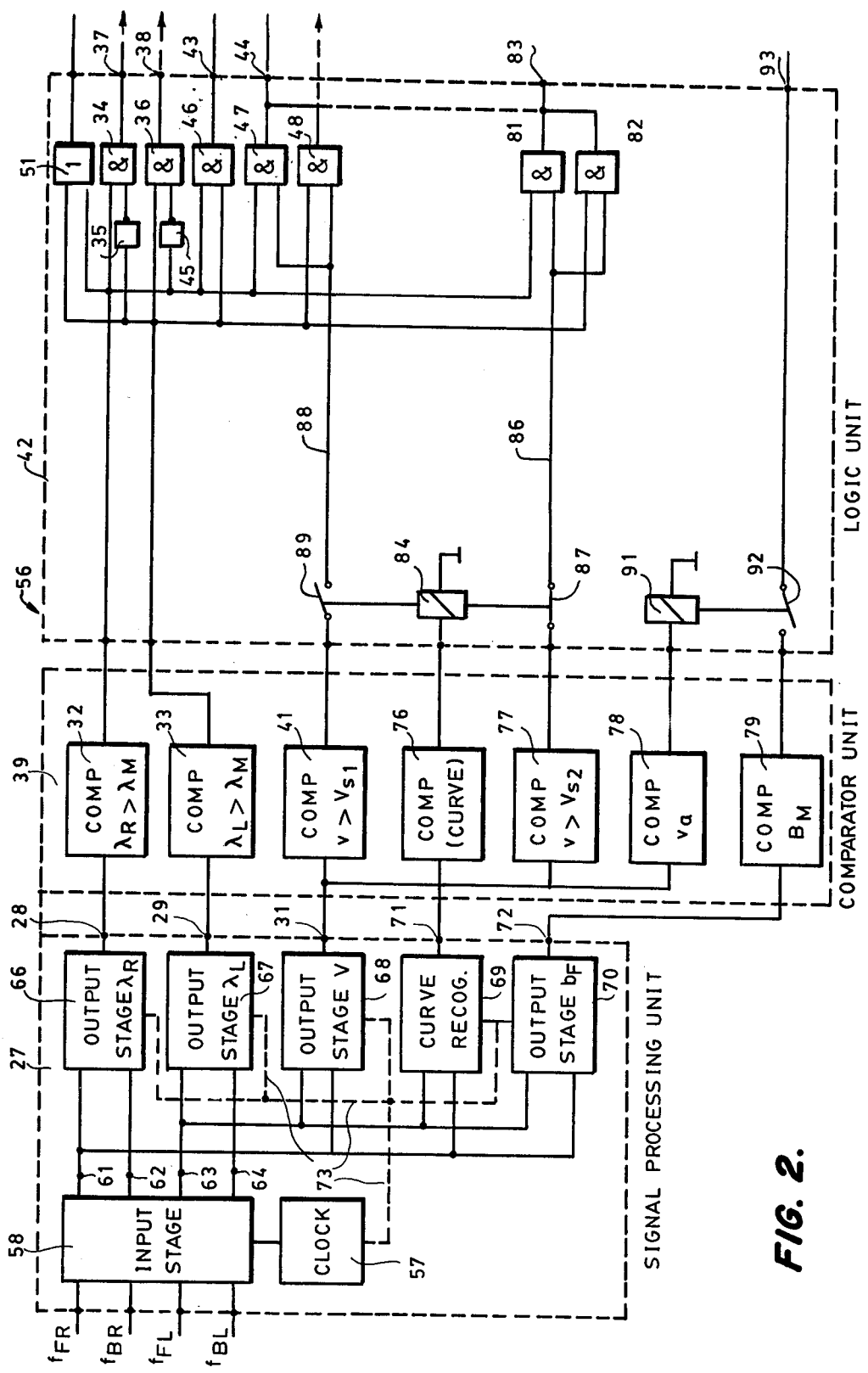
FIG. 2 shows a block circuit diagram of the electronic evaluation circuitry of a preferred embodiment of a propulsion control system, which corresponds, with regard to its basic construction, to the system according to FIG. 1.

In a preferred configuration of the propulsion control system 10, according to the invention, its evaluation circuit 56 has the structure which can be seen in more explicit detail in FIG. 2, the evaluation circuit 26, according to FIG. 1, being completely contained within the evaluation circuit 56 according to FIG. 2.

The signal processing stage 27 of the evaluation circuit 56 includes an input stage 58, which is controlled by a clock unit 57 and which processes the output signals from the wheel speed sensors 16 to 19, which are received, at its input terminals, within successive cycle time intervals, of equal duration $\Delta t$, which are present by the repetition time of the clock unit 57, to produce the output signals $f_{RF}$, $f_{RB}$, $f_{LF}$ and $f_{LB}$, which are proportional to the wheel rotation speeds, the f-signals present at the output terminals 61 to 64 of the input stage 58 being characteristic, in each case, of that cycle time interval $\Delta t$ which elapsed before the cycle time interval which is just ending.

It may be assumed, for the purpose of explanation, that the input stage 58 and the remaining functional elements and functional units, making up the evaluation circuit 56, are designed as digital electronic circuit units. In this case, the output signals from the input stage 58 are available, for example, as bit signal combinations which are characteristic for the counter-reading of a frequency counter. For the sake of simplifying the representation, the outputs of each individual counter are represented, in each case, by only one of the outputs 61 to 64.

The signal processing stage includes a total of five output stages, 66 to 70, which emit, at the output terminals 28, 29, 31, 71 and 72 of the signal processing stage 27, in each case, one of the output signals which are proportional to slip, vehicle speed, radial acceleration and vehicle acceleration, and which are to be further processed in the comparator unit 39.

The two output stages 66 and 67, which respectively generate an output signal characterizing the slip $\lambda_R$ and $\lambda_L$ of the righthand and lefthand driven wheels, are designed, in each case, as difference forming elements, for example as forwards/backwards counters, to which the two wheel speed signals, $f_{RF}$ and $f_{RB}$, and, respectively, $f_{LF}$ and $f_{LB}$ are supplied as input signals.

The output stage 68, which emits, at output terminal 31, the output signal which is proportional to the speed of the vehicle, can be designed, for example, as a summing circuit, which adds up, for each cycle time interval $\Delta t$, the $f_{RF}$ and $f_{LF}$ signals occurring at the outputs 61 and 63 of the input stage 58.

The output stage 69, provided for recognizing that the vehicle is following a curved path, can likewise be designed, in the most simple case, as a difference forming circuit, which generates a signal indicating that the vehicle is following a curved path, this signal being proportional to the difference between the $f_{RF}$ and $f_{LF}$ signals, determined for the undriven, front wheels of the vehicle, these signals being necessarily different while the vehicle is following a curved path.

The output stage 70, which is provided for detecting the acceleration of the vehicle in its direction of motion, is designed in the form of a dividing circuit, which likewise receives, as input signals, the $f_{RF}$ and $f_{LF}$ signals, which are characteristic of the wheel speeds of the undriven front wheels, and which emits an output signal, at output terminal 72, which is proportional to the quantity corresponding to the expression $(f_{RF}+f_{LF})/\Delta t$.

The cycle times of the output stages 66 to 70 are also synchronized by means of the clock unit 57, as indicated by appropriate control lines 73, drawn with broken lines.

In addition to the $\lambda_R$ and $\lambda_L$ comparators 32 and 33, and the v comparator 41, which have completely analogous functions within the scope of the evaluation circuits 26 and 56 according to FIGS. 1 and 2, four further comparators 76 to 79, are provided within the scope of the comparator unit 39, the processing cycle times of these comparators likewise being synchronized by means of the clock unit 57 of the signal processing stage 27.

These additional comparators, 76 to 79, generate a high level output signal whenever the input signal supplied to them exceeds a defined threshold value:

The threshold values, $b_R$, for recognizing that the vehicle is following a curved path (comparator 76), $v_{s2}$, for straight-line motion (comparator 77), $v_a$, for the phase in which the vehicle is started from rest (comparator 78), and $B_M$, for straight-line acceleration (comparator 79), are selected such that the output signal from any of these comparators 76–79 represents an indication or a measure of the fact that the vehicle is in a situation which requires, for reasons of safety or expediency, an alteration in the control behavior of the propulsion control system 10. Within the scope of the evaluation circuit 56, the one vehicle speed comparator 41 is set, in a typical case, to a threshold value $v_{s1}$ of approximately 40 km/h, and the second vehicle speed comparator 77 is set to a typical threshold value $v_{s2}$ of approximately 100 km/h.

The logic unit 42, which generates the control output signals required in the sense of the control behavior, as comprehensively explained in the introduction, of the propulsion control system according to the invention, from a suitable logic combination of the high level comparator output signals from the comparator unit 39, includes, in addition to the components 46, 47, 48 and 51 which have already been explained by reference to FIG. 1, two further dual input AND elements, 81 and 82, which receive, at one of their input terminals in each case, the output signal from the $v_s$ comparator 77, and receive, at their other input, the output signal from the $\lambda_M$ comparator 32 or 33, respectively. The output terminals of these two AND elements 81 and 82 are connected to a common output terminal 83 of the logic unit 42. A reduction of the output torque of the drive unit is triggered by a high level output signal which appears at this output terminal 83. A relay 84 can be triggered by the output signal from the comparator 76, which receives the output signal from the device for recognizing that the vehicle is following a curved path, this relay 84 possessing a break contact 87, located in the common input line 86 to the two AND elements 81 and 82, and a make contact 89, located in the common input line 88 to the two AND elements 47 and 48, which can be connected to the $v_{s1}$ comparator 41.

A further relay, 91, can be triggered by the output signal from the $v_a$ comparator 78, which is set, for example, to a $v_a$ value of approximately 20 km/h, the working contact of this relay being a make contact 92, which is open in the normal position. In the working position of the relay contact 92, the output from the vehicle acceleration comparator 79 is directly connected to a further output terminal 93 of the logic unit 42. A control action effecting the reduction of the output torque of the drive unit is likewise triggered by a high level output signal, from the vehicle acceleration comparator 79, appearing at this output terminal 93.

The functions which are carried out by the evaluation circuit 56 according to FIG. 2, in addition to those carried out according to FIG. 1, are then as follows.

The reduction of the output torque of the drive unit, in the sense of "Select-Low" operation, that is to say, when a defined speed threshold value, $v_{s1}$ or $v_{s2}$, is exceeded and, at the same time, a slip signal is present for only one of the driven wheels, which indicates that this wheel is tending to spin, is not effected, when the vehicle is travelling in a straight line, until above a threshold value, $v_{s2}$, of approximately 100 km/h, while the lower threshold value $v_{s1}$ governs the triggering of the "Select-Low" operation of the propulsion control system 10 when the vehicle is following a curved path. Furthermore, a torque reducing control action is applied to the drive unit when a critical threshold value of the propulsion induced acceleration of the vehicle which could lead to a dangerous driving situation is exceeded. This acceleration dependent propulsion control is inoperative below the low speed range, which is bounded by the speed threshold value $v_a$, in order to be able to utilize the full acceleration of the vehicle when starting from rest.

In the evaluation circuit according to FIG. 2, explained earlier in this text, the output stage 69, which is provided within the scope of the device 69, 76 for recognizing that the vehicle is following a curved path, generates a signal which is proportional to the difference $f_{out} - f_{in}$ between the rotation speed of the front wheel on the outside of the curve, $v_{out}$, and that of the front wheel on the inside of the curve, $v_{in}$.

According to the relationship:

$$\omega = (f_{out} - f_{in}) 2\pi r / b \tag{1}$$

in which r denotes the effective rolling radius of the front wheels, and b denotes the track width, this signal is consequently proportional to the angular velocity $\omega$ at which the vehicle drive round the curve.

The transverse acceleration, or radial acceleration, $b_r$, which acts on the vehicle while it is following a curved path, is given by the relationship $$b_r = R_m \times \omega^2 \tag{2}$$

when $R_m$ denotes the radius of the curved path, on which the center of gravity of the vehicle moves while the vehicle follows a curved path. Since the radial acceleration $b_r$, given by the relationship (2), has a maximum value, due to the fact that it is a function of the square of the angular velocity ($\omega$), at that curve radius at which the lateral guidance forces are just sufficient, in the normal case, to keep the vehicle stable when following a curved path at its maximum speed, it is necessary to set the reference threshold value to which the comparator 76, which is connected to the output stage 69, is adjusted, to a value which is low enough to ensure that, in this most critical driving situation, as described above, the control system reliably switches to its "Select-Low" operating mode, as soon as the vehicle starts to follow a curved path. However, this means, on the other hand, that when the recognition of the fact that the vehicle is following a curved path is obtained from the difference between the wheel rotation speeds $f_{out}$ and $f_{in}$, the control system 10 switches, in the majority of cases, into the "Select-Low" operating mode, even before this is in any way necessary. In this context, "out" and "in" respectively indicate the sides of the vehicle on the outside and the inside of the curve.

Figure 3:
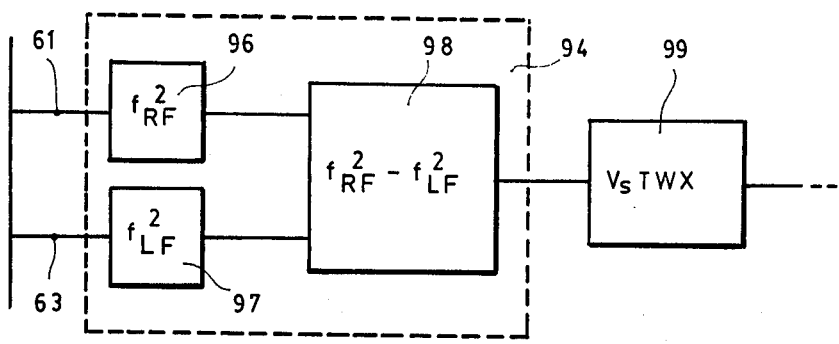
FIG. 3 shows a block circuit diagram of a device for recognizing that the vehicle is following a curved path, this device being provided within the scope of the evaluation circuitry according to FIG. 2.

In contrast to the above, the special device for recognizing that the vehicle is following a curved path, which device is represented in FIG. 3 and can readily be incorporated into the evaluation circuit 56 according to FIG. 2, effects the control of the switching of the control system 10 into its "Select-Low" operating mode in a manner which depends, to a very good approximation, on the transverse acceleration.

This device for recognizing that the vehicle is following a curved path, which device is integrated, in the representation according to FIG. 3, into the evaluation circuit 56 and is marked, in its entirety as 94, comprises two squaring stages 96 and 97, each of which is supplied with, as an input signal, one of the wheel speed signals $f_{RF}$ and $f_{LF}$, which respectively appear at the output terminals 61 and 63 of the input stage 58. The output signals from the squaring stages 96 and 97, which are, in each case, proportional to the square of the input signals, are supplied as input signals to a subtracting stage 98, the output signal from which is proportional to the magnitude of the difference $(f^2_{RF} - f^2_{LF})$. Under the realistic assumption that, when the vehicle is following a curved path, the radius $R_m$ of the curved roadway is large in comparison to the width b of the vehicle, this signal is, to a very good approximation, proportional to the effective radial acceleration $b_r$.

If the peripheral speeds of the undriven front wheels 11 and 12 are denoted by $v_{out}$ and $v_{in}$, the following relationships hold good:

$$v_{out} = 2\pi f_{out} \times r = \omega(R_m + b/2) \tag{3}$$

and $$v_{in} = 2\pi f_{in} \times r = \omega(R_m - b/2) \tag{4}$$

From (3) and (4), it follows directly that:

$$2\pi r(f_{out} + f_{in}) = \omega R_m \tag{5}$$

Multiplication by (1) then yields $$4\pi^2 r^2 (f_{out} + f_{in})(f_{out} - f_{in}) = R_m \omega^2 = b_r \tag{6}$$

that is to say, $b_r$ is proportional to the difference between the squares of the speeds of the front wheels 11 and 12, on the inside and the outside of the curve.

With the aid of the device 94 for recognizing that the vehicle is following a curved path, it is consequently possible, solely by electronically evaluating the output signals from the wheel rotation speed sensors 16 and 17, to obtain a control signal $b_r$, which is proportional to the radial acceleration and which can be employed to trigger a $v_s$ threshold value transmitter 99 which, in turn, generates the reference signal for a vehicle speed comparator, for example, the comparator 41 or the comparator 77, the output signal from this comparator being employed to control the "Select-Low" operation. In doing so, it is particularly advantageous if the threshold value output signal from the threshold value transmitter 99 varies with the output signal from the subtracting stage 98, which signal indicates that the vehicle is following a curved path, or indicates the radial acceleration, in a manner such that the $v_s$ threshold value lies in the region of approximately 40 km/h when large values are being detected for the radial acceleration $b_r$, and lies in the region of approximately 100 km/h when the radial acceleration values are low, and, between these values, decreases as the radial acceleration increases.

A signal for indicating that the vehicle is following a curved path, and which is suitable for the propulsion control system 10 explained above, can also be obtained when the movement of an element for actuating an electric switch is coupled to a component of the vehicle steering mechanism, for example to the steering sector of a worm-and-sector steering mechanism, or to the steering fork of a screw-and-nut steering mechanism, this component assuming a neutral mid-position, when the vehicle is following a curved path, this actuating element tripping this switch as soon as the steering mechanism is turned through a defined minimum deflection, and thereby triggering the signal which indicates that the vehicle is following a curved path.

A transducer can also be coupled to such a movable component of the steering mechamism, this transducer generating an electrical output signal which is proportional to the deflection of the moveable component, from its neutral position, and is thus proportional, to a first approximation, to an average lock angle $\alpha_m$ of the steered vehicle wheels 11 and 12. This output signal from the transducer, for example, from an electric resistance potentiometer, which signal can be utilized as a signal for indicating that the vehicle is following a curved path, then contains information regarding the radius of the curve $R_m$, according to the relationship:

$$tg\alpha_m = a/R_m \tag{7}$$

in which a denotes the wheel base. In conjunction with the vehicle speed information, which can be obtained from the wheel speeds $f_{out}$ and $f_{in}$, according to the relationships (3) and (4), this information can likewise be processed, by means of a suitable electronic evaluation circuit, of the analog type or of the digital type, in accordance with the relationship:

$$b_r = (v_{out} + v_{in})^2/R_m \tag{8}$$

to produce an output signal which is proportional to the transverse acceleration and which can be employed to trigger a vehicle speed threshold value transmitter in accordance with the driving situation, this threshold value transmitter being provided within the scope of the propulsion control system 10.

Electrical signals which are proportional to the transverse acceleration and are suitable for this purpose can also be generated by means of centrifugal force sensors, in which an inert mass is provided, which can shift in the transverse direction of the vehicle against the restoring forces produced by resilient elements, the deflection, as a function of centrifugal force, of this mass from its rest position, which corresponds to motion of the vehicle in a straight line, being detected by means of known types of transducer, which operate potentiometrically or inductively.

In order to achieve, with the propulsion control system 10 according to the invention, the best propulsion induced acceleration possible, even when there are large differences between the effective adhesion coefficients $\mu_R$ and $\mu_L$ on the two sides of the vehicle, it can be necessary to brake the particular drive wheel which is tending to spin, with a very high braking force, so that the higher adhesion coefficient which is effective at the other drive wheel can be utilized to the full.

Accordingly, in the text which follows, there is initially a discussion of the dimensioning which, in this context, is considered most advantageous, of the brake pressure source 53 which is provided within the scope of the propulsion control system 10, FIG. 1.

For explanatory purposes, a driving situation is assumed, in which the propulsion induced acceleration is continuously increased, and in which markedly different coefficients $\mu_L$ and $\mu_R$ are present at the lefthand and righthand sides of the roadway, it being assumed that $\mu_R < \mu_L$.

For a vehicle with rear wheel drive, the following relationship describes the maximum vehicle acceleration which can be achieved:

$$I_{max} = \frac{\psi \times (\mu_L + \mu_R)/2}{1 - \chi \times (\mu_L + \mu_R)/2} \tag{9}$$

in which $\psi$ denotes that proportion of the load which is on the rear axle, and $\chi$ denotes the vertical position of the center of gravity, relative to the wheel base.

For vehicles with front wheel drive, the relationship corresponding to the relationship (9) is expressed as follows:

$$I_{max} = \frac{(1 - \psi) \times (\mu_L + \mu_R)/2}{1 + \chi \times (\mu_L + \mu_R)/2} \tag{10}$$

In the driving situation which is assumed, the righthand rear wheel will spin first.

If the peripheral acceleration of the wheels, acting on the vehicle, or the acceleration of the vehicle, is denoted by $I_1$, the mass of the vehicle by m, the inertia force acting on the vehicle by $F_1$, and the peripheral forces acting in total on the driven wheels 13 and 14 by $F_{ptot1}$, the following relationships hold good:

$$F_1 = mgI_1 = F_{ptot1} = 2F_{p1} \tag{11}$$

in which $F_{p1}$ denotes the peripheral force acting at the vehicle wheels 13 and 14. As a result of the intervention by the propulsion control system, and the braking of the rear wheel which spins first, this wheel being, in the example chosen for this explanation, the righthand rear wheel 13, the peripheral force at this wheel is essentially held to the value $F_{p1}$, but at the cost of an additional increase in the peripheral force at the lefthand rear wheel 14, which now, in its turn, reaches the spinning limit, whereupon the propulsion control system 10 responds by reducing the output torque of the drive unit, and holds the peripheral force $F_{p2}$, at the lefthand rear wheel 14, essentially to the maximum value which is compatible with the higher adhesion coefficient $\mu_L$, so that the following statement can be made, analogously to relationship (11):

$$F_2 = mgI_2 = F_{ptot1} = F_{p2} + F_{p1} \quad (12)$$

The braking force $F_{bp}$, which has to be applied at the periphery of the righthand rear wheel 13, which is braked, and which force is necessary in order to brake this wheel sufficiently to enable the maximum propulsion torque compatible with the adhesion coefficient $\mu_L$, applying at the other driven wheel, to be fully utilized at the wheel, is then given by $$F_{bp} = F_{ptot2} - F_{pttot1} = F_2 - F_1 = mg(I_2 - I_1) \quad (13)$$

If the cross-section of the brake caliper piston is denoted by $F_k$, the output pressure from the pressure source 53 of the brake fluid by p, the coefficient of friction of the brake pads by $\mu_B$, the mid-radius of the brake disc by $r_m$, and the effective rolling radius of the driven rear wheels 12 and 13 by r, this peripheral braking force is given by:

$$F_{bp} = \frac{r_m}{r} \times 2\mu_B F_k \times p \quad (14)$$

from which, taking (13) into account, the following relationship results:

$$p = \frac{r}{r_m} \times \frac{(I_2 - I_1)}{2\mu_B F_k} \times mg \quad (15)$$

Taking the relationship (9) into account the above relationship yields the following expression for $(I_2 - I_1)$:

$$I_2 - I_1 = \psi \left[ \frac{(\mu_L + \mu_R)/2}{1 - \frac{(\mu_L + \mu_R)}{2} \times \chi} - \frac{\mu_R}{1 - \mu_R \times \chi} \right] \quad (16)$$

On substituting expression (16) into the relationship (15), and evaluating this relationship using the following values:
 $r = 0.302$ m; $r_m = 0.106$ m; $F_k = 11.34$ cm² (approximately equivalent to a diameter of 38 mm)
 $m = 2000$ kg; $g = 10$ ms$^{-2}$; $\mu_B = 0.3$
and using the following extreme values for the prevailing adhesion coefficients:
 $\mu_L = 0.9$ and $\mu_R = 0.1$
yields, for the required brake medium pressure, $$p = \frac{0.302}{0.106} \times \frac{0.210}{2 \times 0.3 \times 11.34} \times 2000 \times 10 = 1760 \ N/cm^2,$$

this value being approximately equal to 175 bar.

Since this brake medium pressure, which is required for handling large differences between the adhesion coefficients on the lefthand and righthand sides of the vehicle, exceeds the output pressure of pressure sources which are conventionally available on the vehicle, a pressure intensifier 101 is provided, within the scope of the pressure source 53, which is provided for the propulsion control system 10 in accordance with the invention, this pressure intensifier 101 enabling the output pressure level of a pressure source 53, which is available on the vehicle for example for power assisted steering or a level regulating system, to be upgraded to the pressure level required for the propulsion control system 10.

Since, when the difference between the adhesion coefficients $(\mu_R - \mu_L)$ is large, and/or when the vehicle is being driven in an irresponsible manner, the control system 10 is frequently triggered, it is possible, in such cases, after many repetitions of the control cycle, for the brakes 21 and 22 of the driven wheels 13 and 14 to overheat. It is accordingly advantageous if a protection device 100 is provided, which is represented in its basic construction in FIG. 4, this device initially emitting a warning signal when the brakes 21 and 22 are being subjected to a high heat input and after a certain reaction time, if the driver does not respond to the warning switching off the propulsion control system 10, or switching it over to the higher speed reference threshold $v_{s2}$, as a result of which the brakes 21 and 22 are likewise effectively protected against excessively intensive use.

The work E, which is converted in the wheel brakes 21 and 22, can be calculated from the relationship (14) where U denotes the wheel circumference and N denotes the number of revolutions which each wheel makes during one control cycle:

$$E = U \times \sum_i F_{bpi} \times N_i = \frac{r_m}{r} \times 2\mu_B \times F_k \times U \times \sum_i p_i N_i \quad (17)$$

the successive control cycles being indexed by i.

This energy is initially converted into heat, and is stored in the brake disc, or brake discs.

If the energy stored in the brake discs is denoted by W, the specific heat of the brake disc material by C (approx. 570 Nm/kgK), the increase in the temperature of the brake discs, on being subject to this heat input, by $\Delta T$, and the effective mass of the individual brake discs by $m_s$, the following holds good, for each of the two brakes:

$$W = C \times m_s \times \Delta T \quad (18)$$

Figure 4A:
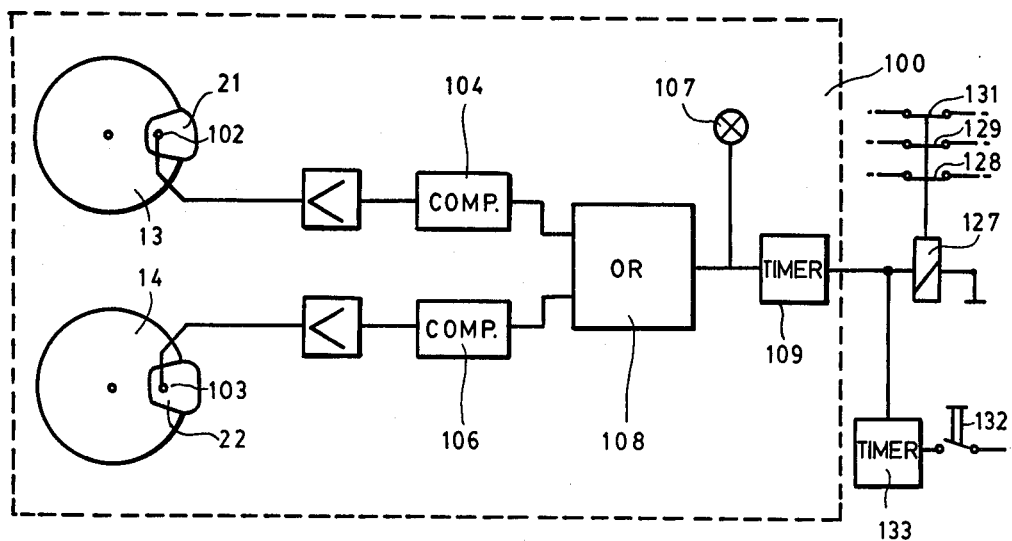
FIGS. 4a to 4c show block circuit diagrams of various protection devices which can be employed within the scope of the propulsion control system according to FIGS. 1 to 3 and FIGS. 5a and 5b show the logic circuitry of an embodiment of a propulsion control system, according to the invention, this embodiment being specifically suitable for use in combination with an antiblock system.

In the design of the protection device 100 represented in FIG. 4a, a temperature sensor 102 and 103, is provided for each wheel brake, 21 and 22, these sensors being for example NiCr thermocouples, the electrical output signal from each sensor being a measure of the brake disc temperature T. These thermocouples 102 and 103 are preferably located in holes in the brake pads, a wear sensor also being located in these holes. This arrangement of the temperature sensors 102 and 103 is simple to achieve, from the design point of view and enables the brake disc temperature to be sensed with sufficient accuracy, even if only indirectly. After appropriate amplification, the output signals from the temperature sensor 102 and 103 are respectively supplied to the temperature signal comparators 104 and 106, each of which generates an output signal as soon as the output signals from the respective temperature sensors 102 or 103, reach or exceed a signal level which is associated with a critical value $T_s$ of the brake disc temperature T. An alarm signal is derived from the OR combination of the output signals from the $T_s$ comparators 104 and 106, this alarm signal triggering for example a warning light 107. The output signal from the OR element 108 which is provided for this purpose is supplied to a timing element 109, which emits an output signal, triggering the switching off of the propulsion control system 10, if the output signal from the OR element 108 is present for longer than a reaction time span $\Delta T_1$. As soon as the output signal from the OR element 108 has declined again, the propulsion control system 10 is switched on again, after the above-mentioned reaction timespan $\Delta T_1$.

If, furthermore, the power which is dissipated by thermal conduction and radiation is denoted by P in Nm/s, this power being known from heat dissipation measurements, it thus follows from the relationship (17) that $$K \times \sum_i p_i N_i \leq C \times m_s \times \Delta T + P \times t \qquad (19)$$

in which $$K = \frac{r_m}{r} \times 2 \times \mu_B \times F_k \times U$$

The value of $C \times m_s \times \Delta T$ is once again given by specifying a particular critical limiting temperature $T_s$.

Figure 4B:
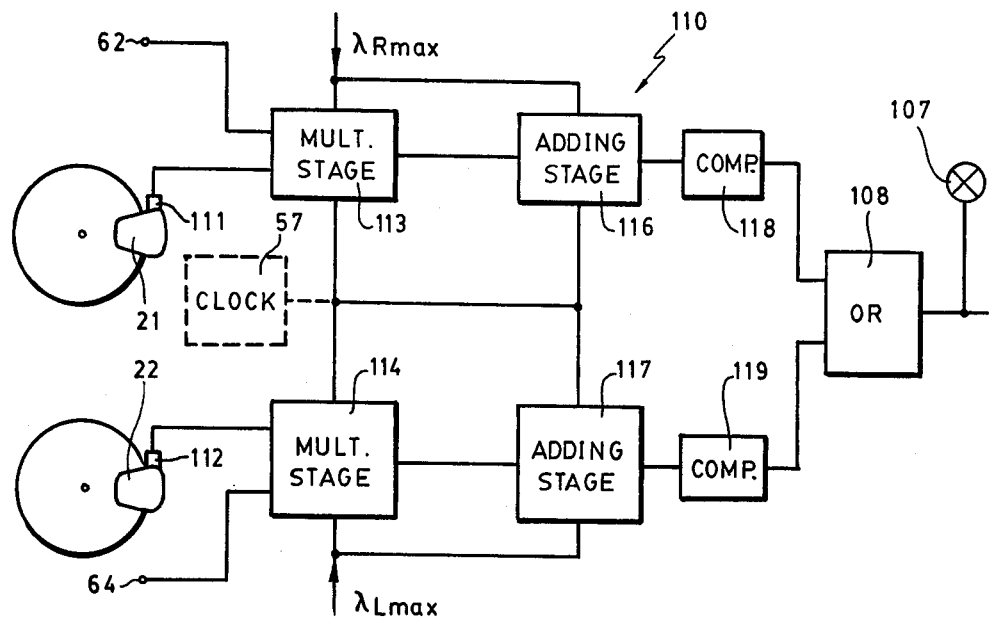

A protection device 110, which functions by evaluating the relationship (19) is represented in FIG. 4b, in the form of a heavily simplified block circuit diagram.

The wheel brakes 21 and 22 are equipped, respectively, with pressure sensors 111 and 112, which generate digital output signals which characterize the brake fluid pressure. The analog/digital converters, necessary for this purpose, are not separately represented. The multiplication stages 113 and 114, which are series connected with the pressure sensors 111 and 112, and addition stages 116 and 117, which are, respectively, series connected after these multiplication stages, are activated for as long as an output signal is present, from either of the two slip value comparators 32 and 33 of the evaluation circuit 56 according to FIG. 2, this output signal indicating that the propulsion control system is in operation, and that one of the wheels 21 or 22 is being braked. The cycle times of the multiplication stages 113 and 114 and of the addition stages 116 and 117 are synchronized by means of the clock unit 57 (FIG. 2). The multiplication stages 113 and 114 receive, as the second multiplier input signal, the wheel rotation speed signals $f_{RB}$ and $f_{LB}$, for the driven wheels, these signals being emitted from the output terminals 62 and 64 of the input stage 58 and generate, for each cycle time interval $\Delta t_i$, an output signal which is proportional to the product $p_i \times f_{RBi}$ and respectively, $p_i \times f_{LBi}$. The output signals from the multiplication stages, which are emitted for each of the successive cycle time intervals, are added up by the addition stage in question, 116 or 117, for as long as the output signal from the respective slip comparator is present. The output signals from the addition stages 116 and 117, which are a measure of the heat stored in the wheel brake in question, 21 or 22, are, in each case, supplied to a comparator 118 or 119, which each, in turn, emit an output signal as soon as this heat, which is stored in the brakes, exceeds a critical threshold value. The further processing of the output signals from these comparators 118 and 119, can be carried out in the same manner, as explained with the aid of FIG. 4a by reference to the output signals from the comparators 104 and 106.

The information describing the brake fluid pressure, required for the evaluation of the relationship (19) by means of the electronic circuitry of the protection device 110 according to FIG. 4b, can also be obtained by electronically evaluating the relationship (15).

Figure 4C:
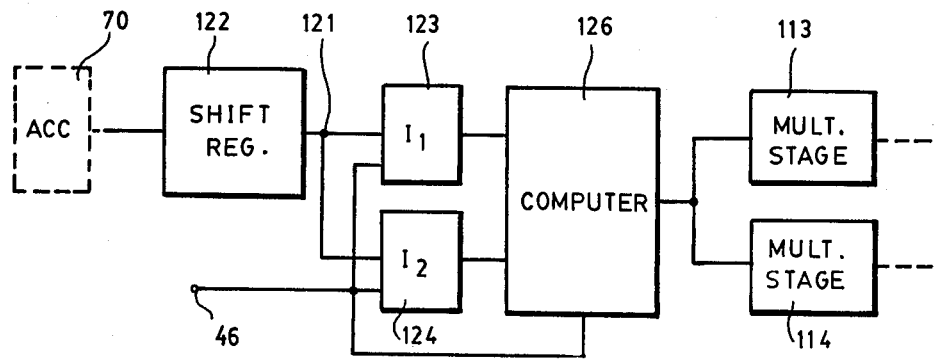

A digital electronic evaluation circuit which is suitable in this regard, is represented, in its basic features, in FIG. 4c, and is explained, in the text which follows, by reference to its mode of operation.

The output signals from the vehicle acceleration output stage 70 (FIG. 2), which represent the acceleration of the vehicle, appear, with a time delay of approximately 0.3 to 0.5 seconds, at the output terminal 121 of a shift register 122, these signals corresponding to a good approximation, to that value of the vehicle acceleration at which the tendency of one or other of the driven wheels 13 and/or 14, is detected. As soon as an output signal from one of the slip value comparators 32 or 33 is present, which causes one or other of the wheel brakes 21 and 22 to be activated, the acceleration information which is present at output terminal 121 is input into the $I_1$ memory 123, where it is held for as long as the associated wheel brake is activated. As soon as a signal is present which indicates that the second wheel is also tending to spin, for instance the output signal which is emitted at output terminal 43 of the logic circuit 42, and which causes the engine torque to be reduced, the information describing the vehicle acceleration is input into the $I_2$ memory 124 and, at the same time a computer stage 126 is triggered, which straight away processes the information stored in the two memories 123 and 124, according to the relationship (15), to produce the required brake fluid pressure information. The output signal from the computer stage containing the pressure information $p_i$, can now be input into the multiplication stages 113 and 114 of the circuit according to FIG. 4b, instead of the $p_i$ signal obtained by means of the pressure sensors 111 and 112, and can be further processed by these multiplication stages as explained previously.

The devices for triggering the functional units, shown in FIG. 4c, in correct accordance with the cycle time are not represented for the sake of simplicity.

For switching off the propulsion control system, a relay 127, FIG. 4a, is provided, this relay being capable of being triggered by the output signal from the protection device 100, and having working contacts 128, 129 and 131, which are designed as break contacts, the triggering of this relay 127 causing the interruption of the control signal, that is, the outputs of 32, 33 and 41, paths leading from the evaluation circuit 56 to the relay valve arrangement 52, FIG. 1, of the pressure source 53 and, as the case may be, to the regulating valves 23 and 24. In addition, a push button 132, FIG. 4a, is provided, by means of which the driver can deliberately switch off the propulsion control system 10, for a period of, for example, twenty seconds.

A timing element 133, which defines this "switched off" period is expediently designed in such a manner that it is reset whenever the ignition is switched off, so that the propulsion control system 10 is in the ready-to-control state whenever the engine of the vehicle is started.

A propulsion control system which largely corresponds, in functional terms, to the propulsion control system 10 according to FIGS. 1 and 2, can also be implemented by deriving acceleration signals, $b_R$ and $b_L$ which characterize the state of motion of the driven rear wheels 13 and 14, instead of the slip signals $\lambda_R$ and $\lambda_L$, and by drawing conclusions, from the magnitudes of these signals, and from their difference, with regard to the tendency of these wheels, 13 and 14, to spin, and computing from these results, the command variable for a propulsion control system, which is largely analogous to the system explained by reference to FIGS. 1 and 2.

An evaluation stage dealing with the evaluation of such acceleration signals can also be provided as an additional functional unit within the scope of a propulsion control system 10, a combination of this type making is possible to achieve further optimization, both of the driving safety, and of the propulsive power which can be utilized. The text which follows explains the construction of a propulsion control system designated generally by the reference numeral 140, the system having an evaluation circuit 141, this explanation being based on FIGS. 5a and 5b, this propulsion control system now being specifically suitable for combination with an antiblock system (ABS) which is available on the vehicle, the brake pressure regulating valves 23 and 24 (FIG. 1) belonging to this ABS system and assigned to the driven wheels, 21 and 22, being capable of assuming three functional positions: normal position, for pressure build up, shut-off position, for pressure holding and a reverse position, which is provided for releasing the brake pressure.

Figure 5A:
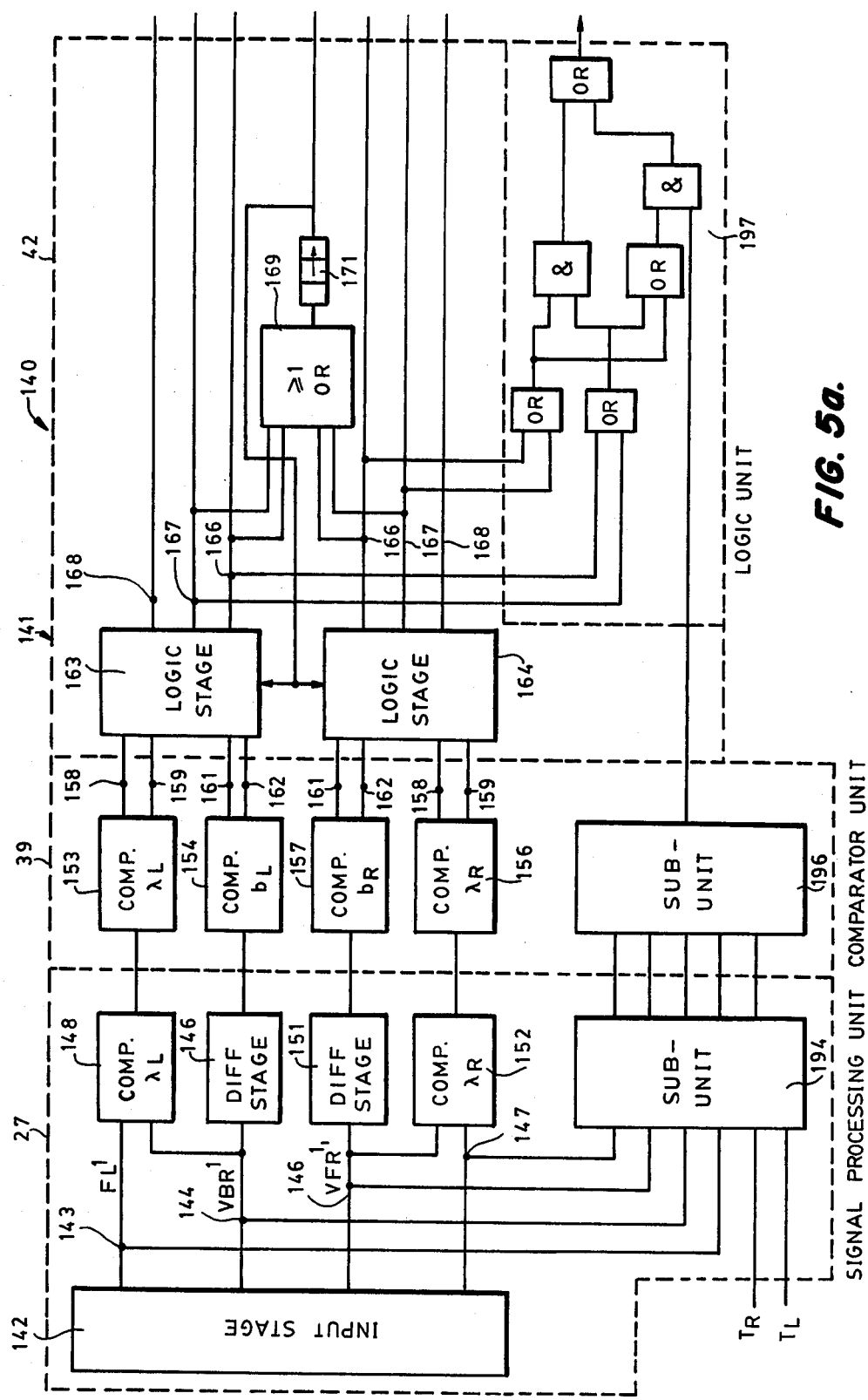

In FIG. 5a, sections of the circuitry which are comparable, or analogous, to sections of the circuitry of the evaluation circuit 56, according to FIGS. 1 and 2, are marked with corresponding reference numbers, that is to say, the sub-division of the evaluation circuit 141, into a signal processing stage 27, a comparator unit 39, and a logic unit 42, corresponds to the sub-division according to FIGS. 1 and 2.

The input stage 142, which receives the output signals from the rotation speed sensors 16 to 19, these signals being proportional to the wheel speeds, generates at its output terminals 143, 144, 146 and 147, respectively, an output signal $v_{FL}$, which is proportional to the peripheral speed of the lefthand front wheel, an output signal $v_{BL}$, which is proportional to the peripheral speed of the left hand (driven) rear wheel, and an output signal $v_{BR}$, which is proportional to the peripheral speed of the righthand (driven) rear wheel, and an output signal $v_{FR}$, which is proportional to the peripheral speed of the righthand front wheel.

The signal processing stage 27 further includes a first comparator 148, which generates, by comparing the $v_{FL}$ signals and $v_{BL}$ signals, an output signal which is characteristic of the slip $\lambda_L$ of the lefthand rear wheel 22, and a first differentiating stage 149, which generates, by differentiating the $v_{BL}$ signal, a $b_L$ output signal which is characteristic of the acceleration or deceleration of the lefthand rear wheel 14, together with a second differentiating stage 151, which emits a corresponding signal $b_R$, for the acceleration of the righthand rear wheel, and a second comparator stage 152, which emits an output signal which is characteristic of the slip $\lambda_R$ of the righthand rear wheel, this signal being obtained by comparing the $v_{BR}$ and $v_{FR}$ signals.

Within the scope of the comparator unit 39 of the evaluation circuit 141, a $\lambda_L$ comparator 153 and a $b_L$ comparator 154 are assigned to the lefthand side of the vehicle and a $\lambda_R$ comparator 156 and a $b_R$ comparator 157 are assigned to the righthand side of the vehicle. The $\lambda_L$ comparator 153 and the $\lambda_R$ comparator 156 possess, in each case, a first output terminal 158, at which terminal a high level output signal, corresponding to a logical 1 value, is emitted, as soon as the slip $\lambda_L$ or $\lambda_R$ reaches or exceeds a first threshold value $\lambda_1$ of, for example, 4 km/h, and each of these comparators also possesses a second output terminal 159, at which a high level output signal is emitted, when the slip $\lambda_L$ or $\lambda_R$ reaches or exceeds a second, higher threshold value $\lambda_2$ of, for example, 12 km/h.

The $b_L$ comparator 154 and the $b_R$ comparator 157 likewise possess, in each case, two output terminals 161 and 162. At, in each case, their first output terminal, the acceleration comparators 154 and 157 emit a high level output signal when the peripheral acceleration, acting in the sense of increasing the wheel rotation speed of the driven wheels, 13 and 14, is equal to, for greater than a preset $+b$ threshold value of, for example, 1 g ($\approx 10$ ms$^{-2}$). A high level output signal is emitted at the second output terminal 162 of each of the acceleration comparators 154 and 157, when the peripheral deceleration of the wheel, or wheels, 13 and/or 14, which is, or are, being braked, is equal to, or greater than, a preset threshold value, $-b$, of, for example, 0.5 g.

For the further processing of the $\lambda_1$ and $\lambda_2$ signals, and the $+b$ and $-b$ signals, generated for each side of the vehicle, logic stages, 163 and 164, are respectively provided, within the scope of the logic unit 42 of the evaluation circuit 141 according to FIG. 5a, these logic stages being constructionally identical and emitting, in accordance with the conditions stated below, control signals from one of their three output terminals 166, 167 and 168 in each case, these signals enabling the brake pressure regulating valve 23, and/or 24, which is allocated to the respective vehicle side, to be directed, in accordance with the driving situation, into their normal (pressure build up) position, shut off (pressure holding) position, or reverse flow (pressure reduction) position.

The above-mentioned conditions, applying to this further processing, are as follows:

A pressure build up signal should be emitted, at the output terminal 166 of the logic stage 163, and/or of the logic stage 164, when the logic stage, or stages, in question, 163 and/or 164, receives or receive a $\lambda_2$ signal, or a $+b$ signal and a $\lambda_1$ signal, or a $+b$ signal and a $\lambda_2$ signal.

A pressure holding signal should be emitted, at the output terminal 167 of the logic stage 163, or, as the case may be, 164, when a $+b$ signal or a $\lambda_1$ signal is received at the output terminals of the logic stage 163 or, as the case may be, 164, which relate to this pressure holding function.

A pressure release signal should be emitted, at the output terminal 168 of the logic stage in question, 163 and/or 164, when either a $-b$ signal, or a $-b$ signal and a $\lambda_1$ signal, or a $-b$ signal and a $\lambda_2$ signal is, or are, present at the appropriate inputs of these logic stages 163 and 164. The output terminals 166 and 167 of the two logic stages 163 and 164 are connected to the input terminals of a 4-input OR element 169, which emits a high level output signal for as long as a pressure holding signal or a pressure build up signal is applied to one of its inputs, either of these signals indicating, at the same time, that the propulsion control system 140 is effective. The activation of both the pressure source 53 (FIG. 1), which is provided for the propulsion control, and of the return pump 25 of the antiblock system is triggered by means of the output signal from the OR element 169, the decay of this signal being somewhat delayed by means of a timing element 171.

Figure 5B:
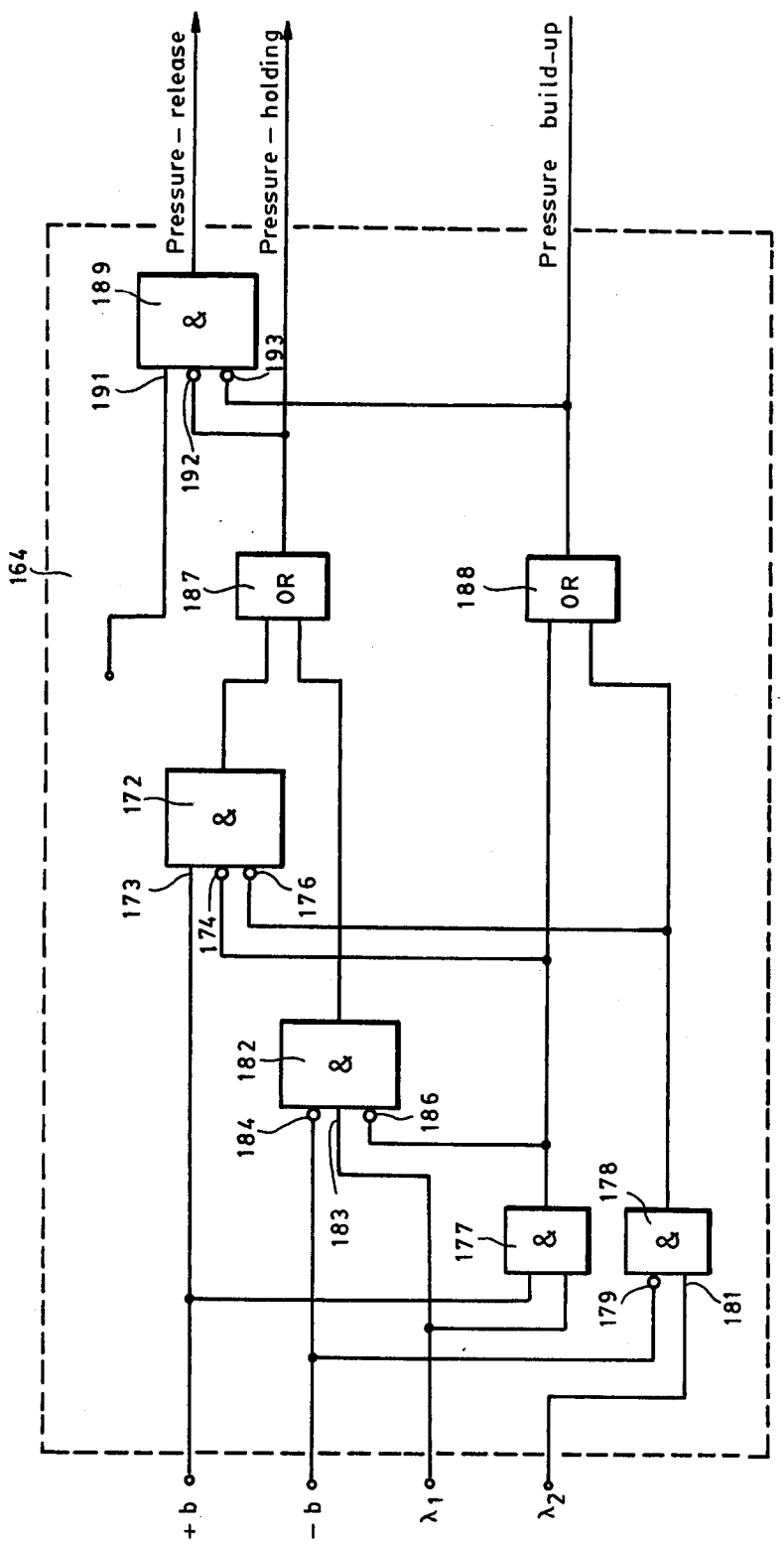

In the text which follows, the construction of the input logic stages 163 and 164, which are provided for generating the pressure release, pressure holding and pressure build up signals is explained in more detail by reference to the logic stage 164 which is represented in FIG. 5b.

The +b signal from the first comparator 157 is an input signal of a 3 input AND element 172, which has, in addition to a non-negated input 173, to which the +b signal is applied, two negated inputs 174 and 176 as further inputs. The output signal from a dual input AND element 177 is supplied to the first negated input 174 of the 3 input AND element 172, the +b signal and the $\lambda_1$ signal being supplied, as input signals, to this dual input AND element 177. The output signal from a further dual input AND element 178 is supplied to the second negated input 176 of the 3 input AND element, the AND element 178 having a negated input 179 and a non-negated input 181. The $\lambda_2$ signal is supplied to the non-negated input 181, and the $-b$ signal is supplied to the negated input 179. In addition, a second 3 input AND element 182 is provided, which possesses one non-negated input 183, a first negated input 184, and a second negated input 186. The output signal from the dual input AND element 177 is applied to this negated input 186. The $-b$ signal is applied to the first negated input 184 of the 3 input AND element 182 while the $\lambda_1$ signal is supplied to the non-negated input 183.

In addition, a dual input OR element 187 is provided, to which the output signals from the two 3 input AND elements, 172 and 182, are supplied as input signals. The output signal from this OR element 187 is the pressure holding signal.

A second dual input OR element 188 receives, as input signals, the output signals from the two dual input AND elements, 177 and 178. The output signal from this dual input OR element 188 is the pressure build up signal.

Furthermore, a third 3 input AND element 189 is provided, within the scope of the logic stage 164, this element possessing one non-negated input 191, and two negated inputs 192 and 193. The output signals from, in each case, one of the two OR elements, 187 and 188, are respectively supplied to the negated inputs 192 and 193 of this AND element 189. At its non-negated input 191, this 3 input AND element 189 receives the decay delayed output signal from the timing element 171 and the 4 input OR element 169. The output signal from the timing element 171 enables the signal for triggering the return pump 25 of the antiblock system to be maintained for a short additional waiting time, following the decay of the pressure holding or pressure build up signals, so that the pressure reduction can also take place during this period. As soon as this output signal has decayed, the pressure reducing signal also decays, and the control cycle is ended, the brake pressure regulating valves 23 and 24 switching back into their normal position.

The sub-units of the signal processing stage 27, and of the comparator unit 39 of the evaluation circuit 141, which are represented in FIG. 5a by the functional blocks 194 and 196, can be constructed in a manner identical to that explained by reference to FIGS. 1 to 4c, these sub-units emitting a signal, in accordance with vehicle speed threshold values ($v_a$, $v_{s1}$, $v_{s2}$) longitudinal acceleration threshold values, or transverse acceleration threshold values, or in accordance with signals indicating that the vehicle is following a curved path, and when the wheel brakes 21 and 22 overheat, this signal triggering the application of a torque reducing control action to the drive unit of the vehicle, in the sense of a "Select-Low" operating mode of the propulsion control system 140, as soon as only one of the wheel brakes 21 or 22 is activated.

A sub-unit 97 of the logic unit 42 of the evaluation circuit 141 is represented, in detail, in the righthand lower portion of FIG. 5a, this sub-unit effecting the processing of those signals which characterize critical driving situations and/or critical operating conditions of the vehicle, together with the pressure holding and/or pressure build up signals which are output by the logic stages 163 and 164, to generate, in a functionally appropriate manner, the control signal which triggers the torque reducing control action.

While we have shown and described plural embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A system for controlling the propulsion on motor vehicles, to prevent undesired spinning of the driven vehicle wheels, comprising a first control loop means for reacting to the state of motion of at least one driven vehicle wheel to activate a wheel brake when a wheel is tending to spin, a second control loop means for causing the output torque of the drive unit to be reduced in the event of a tendency of driven wheels on both sides of the vehicle to spin, a measuring means for sensing the speed of the vehicle to generate an output signal which is characteristic of said speed, a first comparator means triggered by at least one presettable threshold value $v_{s1}$ of the speed of the vehicle for generating the output signal which effects the reduction of the drive torque as soon as this threshold value is exceeded and a signal is present, which indicates that at least one of a wheel-brake is being activated and one of the driven wheels is tending to spin, wherein a second higher speed threshold-value $v_{s2}$ is preset, and further comprising a $v_{s2}$ comparator means for generating an output signal when the threshold value $v_{s2}$ is being exceeded and as soon as only a single brake-control signal is present to indicate that one of the driven wheels is tending to spin, means responsive to the $v_{s2}$ comparator means output-signal for causing the drive torque to be reduced, means for triggering the first comparator means by the first threshold value $v_{s1}$ and means for activating the first comparator means in response to a sensing that the vehicle is following a curved path.

2. A system according to claim 1, wherein the speed threshold-value $v_{s1}$ is approximately 40 km/h.

3. A system according to claim 1, for a four-wheeled vehicle with one driven wheel and one undriven wheel on each of its sides, further comprising rotation-speed sensor means for generating output signals which are correlated with the respective wheel speeds, signal processing means for generating a first slip-signal $\lambda_1$ proportional to the difference between the speeds of the wheels on one side of the vehicle, and a second slip-signal $\lambda_2$ which is proportional to the difference between the speeds of the wheels on the other side of the vehicle, second and third $\lambda_M$ comparator means receiving respectively as inputs the two slip signals $\lambda_1$ and $\lambda_2$ for generating a control signal in the event that a threshold value $\lambda_M$ is exceeded, means for causing the brake of the driven wheel on the vehicle side in question to be activated in response to the control signal an AND circuit means receiving the slip signals as input signals for generating an output signal to initiate a control action to reduce torque to the drive unit, a switching unit means for processing the wheel-speed signals from the undriven wheels to generate a v-signal proportional to the speed of the vehicle, a fourth comparator means receiving the $v_{s1}$ output signal for generating an output signal when the v-signal exceeds a pre set reference threshold value $v_{s1}$, two dual-input AND gates each receiving the output signal from the fourth comparator means and the output signals from the second and third $\lambda_M$ slip-signal comparator means, one of which is assigned to each side of the vehicle, being supplied to the other input terminals of the AND gates, and an actuator for reducing the drive torque in response to the output signal from the two AND gates.

4. A system, according to claim 3, further comprising two logic element means for generating a control signal, an AND gate means for generating a gate signal in response to a combination of the output signal from one of the second and third $\lambda_M$-comparator means with the inverted output signal from the other of the second and third $\lambda_M$-comparator means, and means in response to the control signal and gate signal for triggering the activation of a wheel-brake of a wheel which is tending to spin.

5. A system according to claim 3, further comprising a fifth comparator means for generating an output signal as soon as the speed, v, of the vehicle exceeds a second threshold value $v_{s2}$, which is greater than the first threshold value $v_{s1}$, two dual-input AND gate means each receiving the output of the fifth comparator means as an input, the other input of the AND gate means receiving the output of one of the second and third $\lambda_M$ slip-value comparator means to produce an output means receiving high-level output signals from the two AND gate means for triggering a torque-reducing control action applied to the drive unit, and an electronic switching element triggered by the output signal from the device means for switching the signal-flow from the fifth $v_{s2}$ comparator means to the AND gate means which are series-connected with the fifth comparator means, as long as the output signal from the device means for recognizing that the vehicle is following a curved path is present, and blocking this signal-flow if this latter output signal is absent.

6. A system according to claim 5, wherein the device means for recognizing that the vehicle is following a curved path comprises, rotation-speed sensor means for respectively sensing the wheel rotation-speed of the undriven wheels and a sixth comparator means for generating a signal indicating that the vehicle is following a curved path determined from the difference between the wheel-speed signals output by the rotation-speed sensor means.

7. A system according to claim 1, wherein means for activating the first comparator means in response to a sensing that the vehicle is following a curved path comprises a device for measuring one of centrifugal force and transverse acceleration.

8. A system according to claim 1, further comprising an electrical switch-contact means for recognizing that the vehicle is following a curved path in response to operation of a vehicle steering mechanism.

9. A system according to claim 1, wherein the device means for recognizing that the vehicle is following a curved path generates an output signal which is proportional to the expression $f_{RF}^2 - f_{LF}^2$, in which $f_{RF}$ and $f_{LF}$ denote the frequencies of the output signals from the rotation-speed sensor means assigned to the undriven wheels.

10. A system according to claim 9, further comprising a speed comparator means, threshold-value transmitter means triggered by the output signal from the device means for recognizing that the vehicle is following a curved path, the signal being proportional to the transverse acceleration for producing a reference signal input to the speed-comparator means, means responsive to the output signal from the speed comparator means for generating a torque-reducing control signal if an output signal from one of the second and third slip-value $\lambda_M$ comparators is present at the same time, the output signal-level of the threshold-value transmitter means varies in the opposite sense to the output signal-level of the device means for recognizing that the vehicle is following a curved path and corresponds to a high threshold value $v_{s2}$ when the vehicle is travelling in a straight line with low transverse acceleration, and to a low threshold value $v_{s1}$ when the transverse acceleration is high when the vehicle is following one of a curved path at high speed and a small-radius curve.

11. A system according to claim 1, further comprising acceleration comparator means responsive to a threshold value of the vehicle acceleration and, in the event of this acceleration threshold-value being exceeded, for generating an output signal causing the drive torque to be reduced.

12. A system according to claim 11, further comprising a further speed comparator means employing a reference threshold-value $v_a$ of approximately 20 km/h, means for extracting an output signal causing the drive torque to be reduced from an AND-combination of the output signal from the acceleration comparator means with the output signal from the further speed-comparator means.

13. A system according to claim 1, further comprising an acceleration comparator means reacting to the propulsion-induced acceleration of the driven wheels for generating an output-signal causing the reduction of the output torque of the drive unit, and for generating an output signal causing a compensatory activation of a wheel-brake of a drive wheel which is being more powerfully accelerated if the magnitudes of the wheel accelerations are unequal.

14. A system according to claim 1, further comprising a pressure source for controlling the propulsion of the output pressure-level p thereof being selected in accordance with the relationship $$p = \frac{r}{r_m} \times \frac{(I_2 - I_1)}{2\mu_B \times F_k} \times mg,$$

in which $I_1$ and $I_2$ denote, respectively, the maximum possible vehicle acceleration under the lowest and the highest possible values of the roadway/wheel adhesion coefficient, r denotes the effective rolling radius of the driven wheels, $r_m$ denotes the mean frictional radius of the brake disc, $\mu_B$ denotes the coefficient of friction of the brake pads, and $F_k$ denotes the cross-section of a brake-caliper piston of the wheel-brakes.

15. A system according to claim 1, further comprising means for switching off the propulsion control system for a time-interval which is preset by means of a timing element and, after the time interval, causing reversion to a ready-to-control state.

16. A system according to claim 1, further comprising a protection means for switching on an alarm indicator in the event of pronounced heating of the brakes of the driven vehicle wheels, and if the overheating of the brake persists, for performing one of switching off that section of the propulsion control system which activates the brakes, and lowering the threshold for the control action which is applied to the drive unit in order to reduce the propulsion torque.

17. A system according to claim 16, further comprising
thermoelectric means for sensing temperature of brake discs of the driven wheels,
means for transmitting the output signals from the means for sensing to the protection means.

18. A system according to claim 16, further comprising
brake pad means of the wheel-brakes having means for sensing temperature of the brake discs.

19. A system according to claim 18, wherein the means for sensing temperature are one of fitted in holes which are provided in the brake pads for receiving wear-sensors and attached to the wear-sensors themselves.

20. A system according to claim 18, further comprising
means for sensing brake means designed as a thermocouple, and
means for generating a wear-indication signal in response to one of the electrical interruption of the thermocouple, and its grounding to the vehicle structure effected via the brake disc.

21. A system according to claim 16, wherein the protection means comprises
at least one multiplication stage means for generating an output signal proportional to the expression $p_i N_i$, in which $p_i$ is the measured value of the brake-fluid pressure for successive cycle time intervals $\Delta t_i$, the total duration of these intervals corresponding to the activation-time of the wheel-brake, and $N_i$ is the number of wheel-revolutions measured for the individual cycle time intervals,
a comparator stage means for generating an alarm indication signal as soon as the output signal exceeds a preset threshold value, which is a measure of a limiting temperature to which the wheel-brake may be heated.

22. A system according to claim 21, wherein wheel brake-cylinder means of the driven vehicle wheels comprise
means for generating an output signal in response to a pressure, and
means for transmitting the pressure output signal as input signals to a multiplication stage means for activating the alarm comparator stage means.

23. A system according to claim 21, further comprising
means for computing
means for transmitting as input to the means for computing signals characterizing vehicle acceleration,
the means for computing a comprising means for generating from acceleration signals by electronic evaluation of the relationship $$p_i = \frac{r}{r_m} \times \frac{I_2 - I_1}{2\mu_B F_k} \times mg$$

the output pressure-signals $p_i$ which are required for evaluating the relationship $$E = K \sum_i p_i N_i$$

wherein $I_1$ and $I_2$ denote, respectively, the maximum possible vehicle acceleration under the lowest and the highest possible values of the roadway/wheel adhesion coefficient, r denotes the effective rolling radius of the driven wheels, $r_m$ denotes the mean frictional radius of the brake disc, $\mu_B$ denotes the coefficient of friction of the brake pads, and $F_k$ denotes the cross-section of the brake-caliper piston of the wheel-brakes, $$\text{where } K = \frac{r_m}{r} \times 2 \times \mu_B \times F_k \times U \text{ and}$$

wherein U is the wheel circumference and $N_i$ is the number of wheel-revolutions measured for the individual cycle time intervals, and $F_k$ is the cross-section of a brake-caliper piston of the wheel brakes.

24. A system according to claim 1, characterized by its configuration as an accessory system to a four-channel anti-block system which is present on the vehicle, the speed sensors of the anti-block system and its brake-pressure regulating valves provided for the driven vehicle-wheels, being employed for analogous purposes as part of the propulsion control system.

25. A system according to claim 24, further comprising
an evaluation circuit means for generating pressure build-up, pressure-holding and pressure-release signals, which are appropriate for controlling brake-pressure regulating valves in response to a logic-combination operation involving threshold-value signal characterizing different values $\lambda_1$ and $\lambda_2$ of the slip of driven wheels, as well as threshold-value signals characterizing the peripheral acceleration ($+b$) and peripheral deceleration ($-b$) of these wheels, in accordance with the conditions:

(i) Generation of the pressure build-up signal, when a $\lambda_2$-signal is present, or when a ($+b$)-signal is present in combination with either a $\lambda_1$-signal or a $\lambda_2$-signal;

(ii) Generation of a pressure-holding signal, when a ($+b$)-signal or a $\lambda_1$-signal is present, and (iii) Generation of a pressure-release signal, when a ($-b$)-signal is present, either on its own, or in combination with either a $\lambda_1$-signal or a $\lambda_2$-signal.

* * * * *